United States Patent
Jiang et al.

(10) Patent No.: US 12,360,552 B2
(45) Date of Patent: Jul. 15, 2025

(54) SYNCHRONIZATION OF DEVICES WITH A GAPPED REFERENCE CLOCK

(71) Applicant: Avago Technologies International Sales Pte. Limited, Singapore (SG)

(72) Inventors: Hongtao Jiang, Irvine, CA (US); Jun Cao, Irvine, CA (US); Afshin Momtaz, Irvine, CA (US); Armond Hairapetian, Irvine, CA (US); Kang Xiao, Tustin, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 382 days.

(21) Appl. No.: 17/841,501

(22) Filed: Jun. 15, 2022

(65) Prior Publication Data

US 2022/0404860 A1  Dec. 22, 2022

Related U.S. Application Data

(60) Provisional application No. 63/211,492, filed on Jun. 16, 2021.

(51) Int. Cl.
| | |
|---|---|
| *G06F 1/12* | (2006.01) |
| *G06F 1/06* | (2006.01) |
| *G06F 1/10* | (2006.01) |
| *G06F 13/42* | (2006.01) |

(52) U.S. Cl.
CPC .................. *G06F 1/12* (2013.01); *G06F 1/10* (2013.01); *G06F 1/06* (2013.01); *G06F 13/4282* (2013.01)

(58) Field of Classification Search
CPC ..... G06F 1/12; G06F 1/10; G06F 1/06; G06F 13/4282
USPC ................................ 713/400, 500, 501, 600
See application file for complete search history.

(56) References Cited

U.S. PATENT DOCUMENTS

| | | | |
|---|---|---|---|
| 4,841,549 A | 6/1989 | Knapp | |
| 6,396,888 B1 | 5/2002 | Notani et al. | |
| 9,996,138 B2* | 6/2018 | Yang | G06F 1/3296 |
| 10,176,281 B2* | 1/2019 | Asaad | G06F 9/455 |
| 11,119,530 B1* | 9/2021 | Pinskiy | G06F 30/396 |
| 2009/0019303 A1* | 1/2009 | Rowland | G06F 1/3237 |
| | | | 713/600 |
| 2011/0239035 A1* | 9/2011 | Cha | H03K 3/84 |
| | | | 713/503 |

(Continued)

OTHER PUBLICATIONS

Extended European Search Report from European Patent Application No. 22179615.4, dated Nov. 10, 2022, 8 pages.

*Primary Examiner* — Ji H Bae
(74) *Attorney, Agent, or Firm* — Foley & Lardner LLP

(57) ABSTRACT

A system is provided that includes a first electronic device, multiple second electronic devices coupled to the first electronic device via respective interfaces, and a clock generator coupled to the second electronic devices and configured to generate and provide a clock signal to each of the second electronic devices for clocking operation of the second electronic devices. The clock signal is a gapped clock signal having at least one gap created by the clock generator removing one or more clock pulses based on a synchronization signal, and the second electronic devices are configured to synchronize data transmission between the second electronic devices and the first electronic device via the interfaces using the at least one gap in the gapped clock signal to align the data transmission.

14 Claims, 5 Drawing Sheets

(56) References Cited

U.S. PATENT DOCUMENTS

| | | | |
|---|---|---|---|
| 2018/0115409 A1* | 4/2018 | Nayyar | G01S 13/343 |
| 2020/0097625 A1* | 3/2020 | Rabinovitch | G06F 30/367 |
| 2020/0292666 A1* | 9/2020 | Maher | G01S 13/325 |

* cited by examiner

SYNCHRONIZATION OF DEVICES WITH A GAPPED REFERENCE CLOCK

This application claims the benefit of U.S. Provisional Application No. 63/211,492, titled "SYNCHRONIZATION OF DEVICES WITH A GAPPED REFERENCE CLOCK" and filed on Jun. 16, 2021, the contents of which are hereby incorporated by reference herein.

TECHNICAL FIELD

The present description relates generally to interfaces between electronic devices including, for example, the synchronization of electronic devices using an interface.

BACKGROUND

Synchronization of electronic devices communicating across an interface is important for many applications. For example, systems that use phased arrays of antenna elements such as phased-array radar, beam-forming antennas, and fifth-generation (5G) cellular transceivers rely on synchronization of the electronic devices involved in supplying signals to the antenna elements to effectively operate. Synchronization signals may be used to align the timing of data communicated by the electronic devices in order to provide deterministic latency needed for synchronization of the electronic devices.

BRIEF DESCRIPTION OF THE DRAWINGS

Certain features of the subject technology are set forth in the appended claims. However, for purposes of explanation, several aspects of the subject technology are depicted in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block-diagram form in order to avoid obscuring the concepts of the subject technology.

Synchronization of electronic devices communicating across an interface is important for many applications. For example, systems that use phased arrays of antenna elements such as phased-array radars, beam-forming antennas, and fifth-generation (5G) cellular transceivers rely on synchronization of the electronic devices involved in supplying signals to the antenna elements to effectively operate. Synchronization signals may be used to align the timing of data communicated by the electronic devices in order to provide deterministic latency needed for synchronization of the electronic devices.

Figure 1:
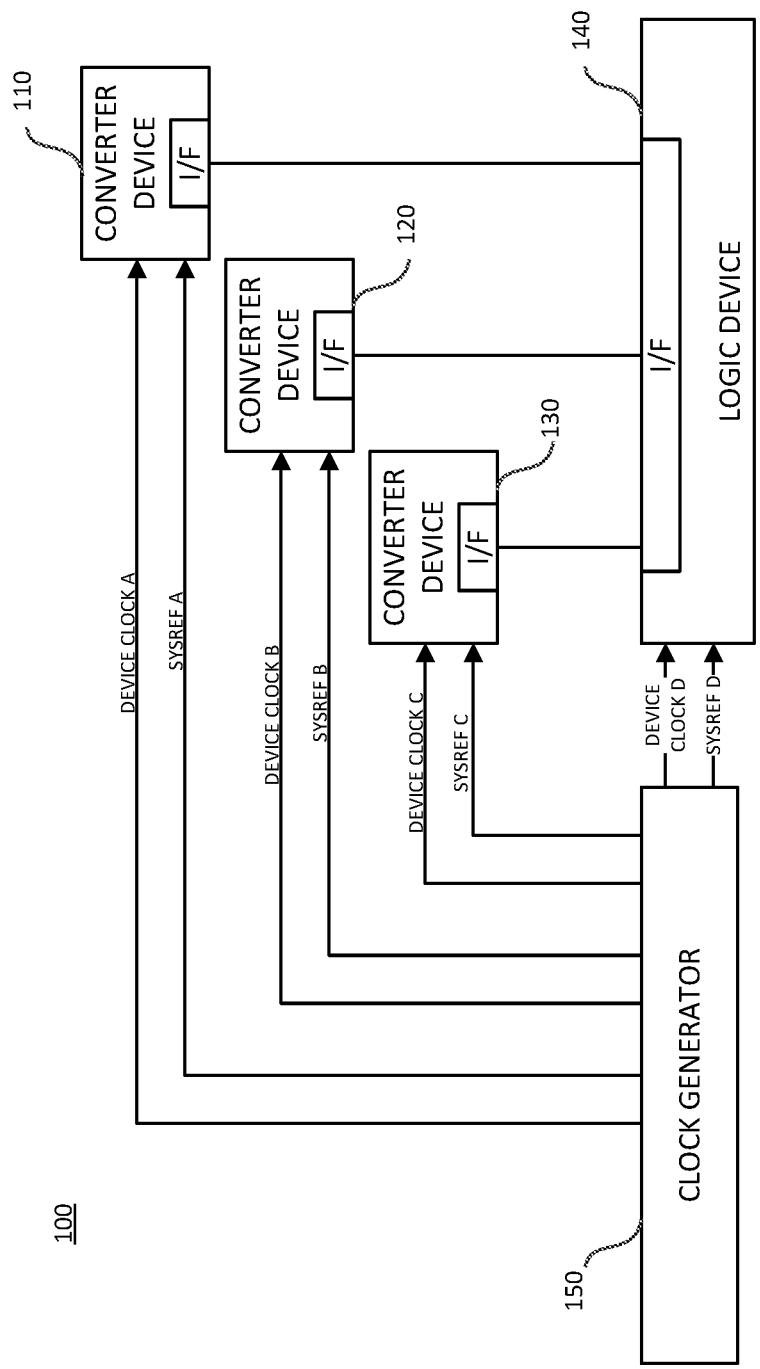
FIG. 1 is a block diagram depicting components of a system in which the operation of electronic devices communicating across an interface is synchronized according to aspects of the subject technology.

FIG. 1 is a block diagram depicting components of a system in which the operation of electronic devices communicating across an interface is synchronized according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 1, system 100 includes converter devices 110, 120, and 130 coupled to logic device 140 via interfaces (I/F), and clock generator 150 coupled to the depicted electronic devices, namely converter devices 110, 120, and 130 and logic device 140. Converter devices 110, 120, and 130 are electronic/semiconductor devices that include suitable logic, circuitry, and/or code to enable the communication of data with logic device 140 across the interface and the conversion of that data from a first format to a second format. For example, converter device 110 may be coupled to antenna circuitry (not shown) and include circuitry implementing an analog-to-digital converter configured to convert analog data signals received via the antenna circuitry into digital data for communication with logic device 140 over the interface. Alternatively, or additionally, converter device 110 may include circuitry implementing a digital-to-analog converter configured to convert digital data received from logic device 140 via the interface into analog data signals and provide the analog data signals to the antenna circuitry for transmission. Converter devices 120 and 130 may be implemented and configured the same as converter device 110 described above.

FIG. 1 depicts three converter devices in system 100. The number of converter devices in a system may vary from three. For example, in a phased-array system there may be a converter device for each antenna element in the phased array. In addition, not all the converter devices need to be identical. For example, there may be a first set of converter devices configured as digital-to-analog converters for transmitting data via the antenna circuitry, and a second set of converter devices configured as analog-to-digital converters for receiving data via the antenna circuitry.

Logic device 140 is an electronic/semiconductor device that includes suitable logic, circuitry, and/or code to enable the communication of data with converter devices 110, 120, and 130 via the interface. Logic device 140 may receive data from another system (not shown) coupled to logic device 140 and convert the format of the data, if necessary, from a first format in which it is received into a second format for communication via the interface. Similarly, logic device 140 may receive data from converter devices 110, 120, and 130 via the interface and convert the format of the data, if necessary, from the second format in which it is received via the interface into the first format before sending the data to the other system (not shown) coupled to logic device 140.

Converter devices 110, 120, and 130 and logic device 140 further include suitable logic, circuitry, and/or code to implement the interface coupling these electronic devices. The interface may be a serial interface which communicates serialized data over a serial communication link between the electronic devices. Parallel data may be serialized at a first electronic device before being sent bit-by-bit to a second electronic device, where the received serialized data is de-serialized into parallel data. The serial communication link may include physical media (e.g., wire, optical fiber) through which a signal (e.g., electrical signal, optical signal) encoded with the serialized data is transmitted, together with physical structural elements and/or circuitry configured to receive the encoded signal from the first electronic device and provide the transmitted encoded signal to the second electronic device. The interface may be implemented according to a standard such as the Joint Electron Device Engineering Council's (JEDEC) JESD204 serial interface standard, for example.

Clock generator 150 is an electronic/semiconductor device that includes suitable logic, circuitry, and/or code to enable the generation of clock and synchronization signals used in the operation of system 100. Clock generator 150 may include an electronic oscillator to generate a master clock signal or may receive a master clock signal from an external source. Clock generator 150 may further include one or more phase-locked loops (PLLs) configured to either maintain the frequency of the master clock signal or increase the frequency to a multiple of that frequency. Frequency dividers may be used to generate multiple clock signals at different respective frequencies. Output of the clock signals by clock generator 150 may be controlled using programmable delay circuits and output buffers.

Synchronization signals generated by clock generator 150 may be periodic or gapped periodic signals at a frequency derived from the master clock signal, or may be a one-shot signal triggered by a control algorithm or an external control signal received by clock generator 150. The synchronization signals may be source synchronous with the clock signals generated by clock generator 150. Clock generator 150 may further include logic, circuitry, and/or code configured to enable or disable the output of the synchronization signals in accordance with a control algorithm or an external control signal received by clock generator 150.

Figure 2:
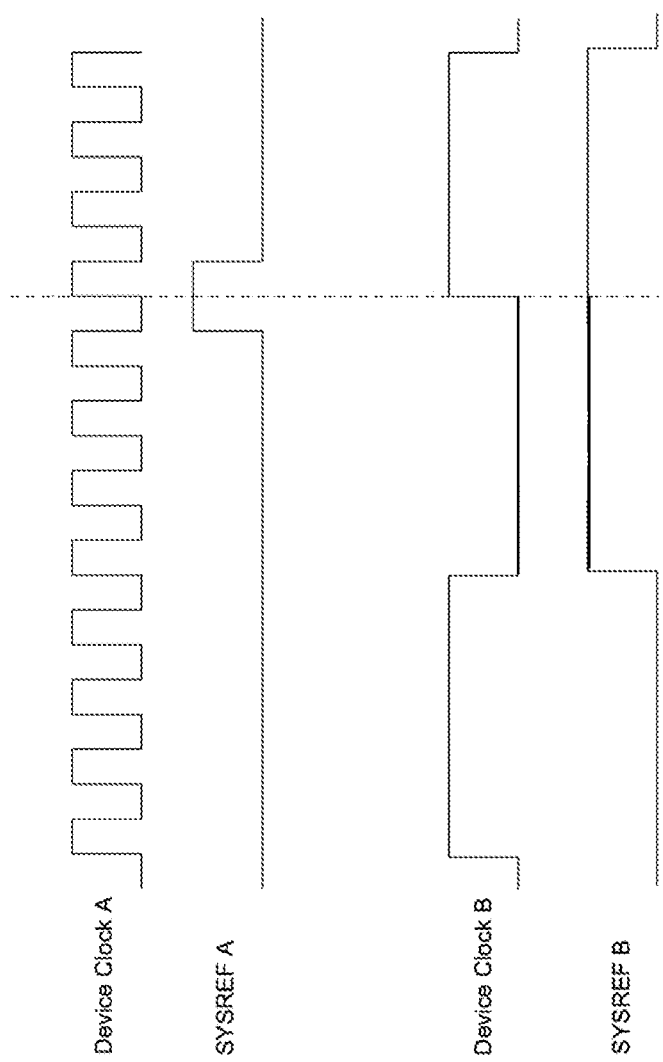
FIG. 2 is an example signal timing diagram illustrating the relative timing of device clock signals and synchronization signals according to aspects of the subject technology.

As depicted in FIG. 1, clock generator 150 is coupled to each of converter devices 110, 120, and 130 and logic device 140 and is configured to provide a respective device clock signal and a respective synchronization signal (SYSREF) to each of these electronic devices. FIG. 2 is an example signal timing diagram illustrating the relative timing of device clock signals and synchronization signals according to aspects of the subject technology. FIG. 2 includes two clock signals, device clock A and device clock B, and two synchronization signals, SYSREF A and SYSREF B. Device clock A and SYSREF A may be provided to a first electronic device and device clock B and SYSREF B may be provided to a second electronic device.

The electronic devices may use device clock A and device clock B as reference clock signals for PLLs to generate one or more internal clock signals for clocking respective operations of the electronic devices. Operations of the electronic devices may include sequences of actions by circuit elements and these operations may be clocked using the internal clock signals to trigger the actions in the circuit elements based on rising edges and/or falling edges of the internal clock signals, for example. Actions in a circuit element may include, but are not limited to, activating/deactivating the circuit element, transitioning the circuit element from one state to another state, changing an output of the circuit element based on an input to the circuit element, etc. For example, a frame clock may be generated from the reference clock signal and used to control the timing of circuit elements used in communicating data frames between electronic devices.

The generated internal clock signals may have a higher frequency, a lower frequency, or the same frequency as the reference clock signal, with aligned phases. The frequencies of the internal clock signals may be selected based on the operations and functionalities of the respective electronic devices. The reference clock signals provided to the electronic devices may have the same frequency or have different respective frequencies with aligned phases, as illustrated with device clock A and device clock B in FIG. 2. Similarly, the synchronization signals may have different frequencies and or durations depending on the reference clock signals that accompany the synchronization signals to the respective electronic devices, as illustrated with SYSREF A and SYSREF B in FIG. 2.

The synchronization signals may be used to align the internal clock signals across multiple electronic devices. For example, the electronic devices may be configured to align edges of the internal clock signals generated using PLLs to an edge of the reference clock signals when the synchronization signals are high in order to align the phases of these signals. As illustrated in FIG. 2, the dashed line identifies a rising edge of the reference clock signals when the respective synchronization signals are high. Each electronic device may be configured to align a rising edge of an internal clock signal, such as a frame clock, with that rising edge of the reference clock signals. In this manner, the internal clocks of multiple electronic devices may be phased aligned with each other to provide synchronization of the electronic devices across a system.

For example, each of converter devices 110, 120, and 130 may be configured to generate respective frame clocks using the reference clock signal received from clock generator 150. The frame clocks may be used to control the timing of data transmission between converter devices 110, 120, and 130 and logic device 140. A rising edge of the frame clock may trigger the start of transmitting the first bit or bits of a data frame via the interface. As noted above, the synchronization signal may be used to align the phases of the frame clocks generated by converter devices 110, 120, and 130. The synchronization signal also may be used to identify which clock cycle in the frame clocks should be used to trigger the start of transmitting a data frame via the interface. In this manner, the data transmission of respective data frames between converter devices 110, 120, and 130 and logic device 140 may be synchronized.

Referring back to FIG. 1, the provision of reference clock signals and synchronization signals between clock generator 150 and each of converter devices 110, 120, and 130 and logic device 140 involves a respective pair of transmission lines or traces. To maintain correct alignment across multiple electronic devices, systems may match the trace type and length of the traces connecting the respective electronic devices to the clock generator. These aspects can complicate the layout and design of a chip or circuit board incorporating the clock generator, converter devices, and logic device. To further complicate the design and layout, the reference clock signals and the synchronization signals may be differential signals each using a pair of traces.

Figure 3:
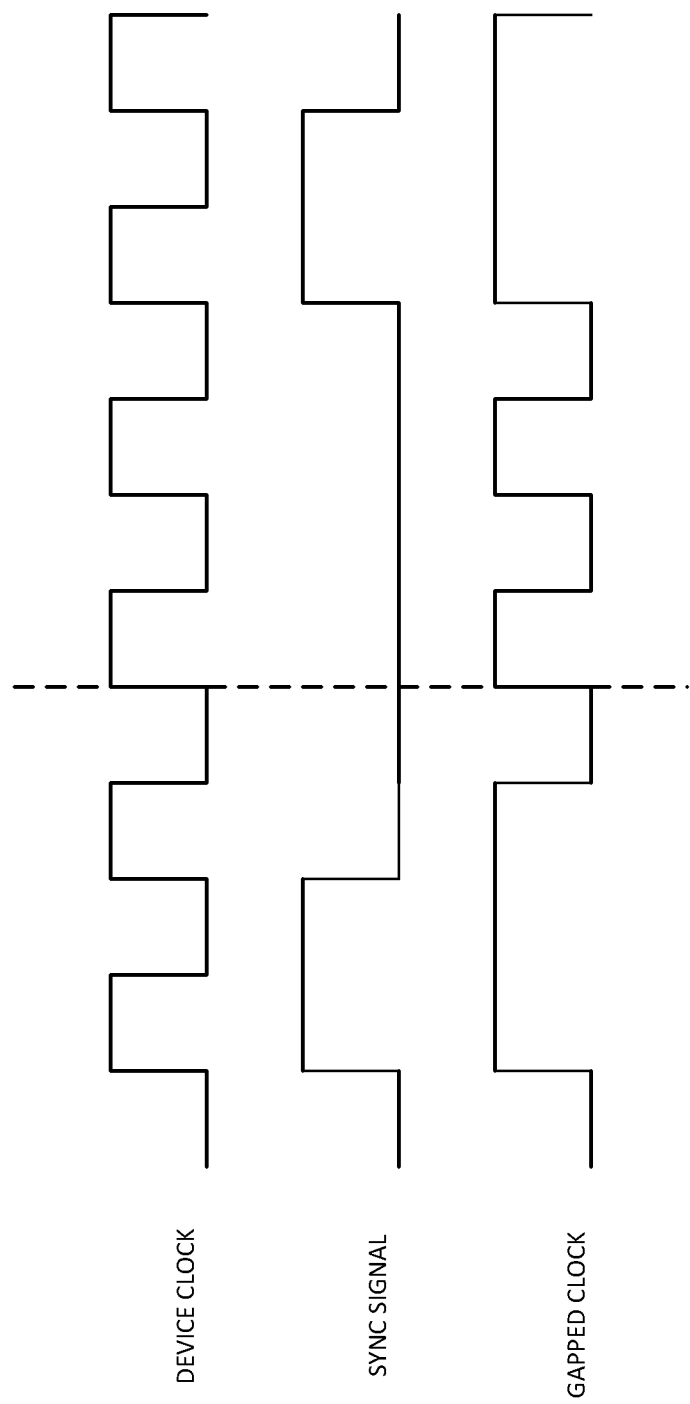
FIG. 3 is an example signal timing diagram illustrating the relative timing of a gapped clock signal generated from a reference clock signal based on a synchronization signal according to aspects of the subject technology.

The subject technology proposes to simplify the design and layout of the chip or circuit board by combining the reference clock signal and the synchronization signal provided by the clock generator to the respective electronic devices. For example, a gapped clock signal may be generated by the clock generator by removing clock pulses from a reference clock signal based on a synchronization signal. FIG. 3 is an example signal timing diagram illustrating the relative timing of a gapped clock signal generated from a reference clock signal (device clock) based on a synchronization signal according to aspects of the subject technology.

As illustrated in FIG. 3, removing clock pulses from the device clock signal when the synchronization signal is high produces the gapped clock signal. The electronic devices that received the gapped clock signal from the clock generator may be configured to align their internal clocks, such as a frame clock, based on the gaps in the gapped clock cycle. For example, the electronic devices may be configured to align their internal clocks with the first rising edge of the signal following a gap, as represented with the dashed line in FIG. 3. The subject technology is not limited to this alignment of the internal clocks and may be implemented using other alignments such as aligning the internal clocks with the rising edge of the signal after a predetermined number of clock cycles have passed following the gap. In addition, the synchronization signal may be inverted such that the clock pulses are removed from the device clock signal when the synchronization signal is sampled low.

Figure 4:
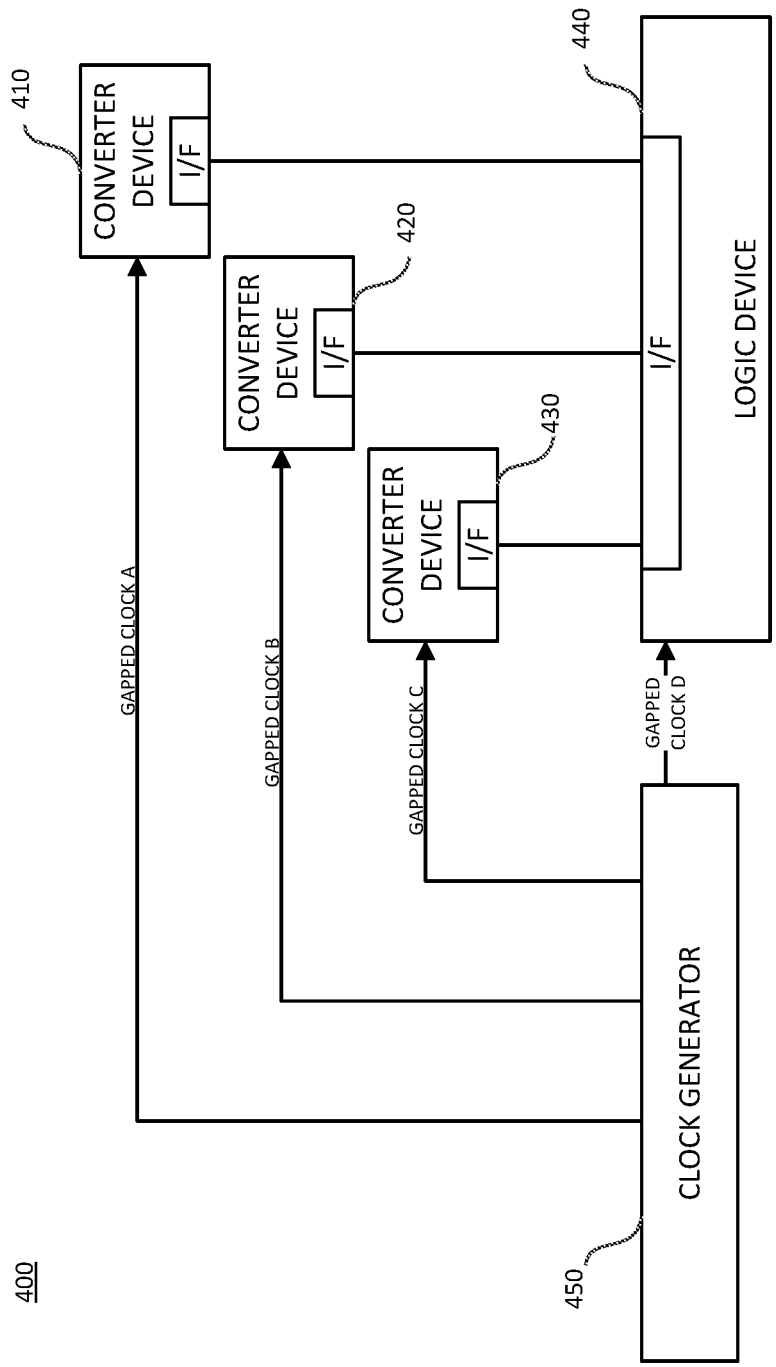
FIG. 4 is a block diagram depicting components of a system in which the operation of electronic devices communicating across an interface is synchronized according to aspects of the subject technology.

FIG. 4 is a block diagram depicting components of a system in which the operation of electronic devices communicating across an interface is synchronized according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 4, system 400 includes converter devices 410, 420, and 430, logic device 440, and clock generator 450. With the exception of how synchronization signals are communicated to the respective electronic devices, the general operations of converter devices 410, 420, and 430, logic device 440, and clock generator 450 align with the operations of their corresponding components described above with respect to FIG. 1, and will not be described again. A comparison of FIG. 1 and FIG. 4 highlights the reduction in traces or transmission lines coupling clock generator 450 to each of converter devices 410, 420, and 430 and logic device 440 that using a gapped clock signal to communicate a synchronization signal together with a reference clock signal provides. This reduction in traces or transmission lines simplifies the layout and manufacturing of system 400 which may reduce costs, produce higher yields, etc.

Figure 5:
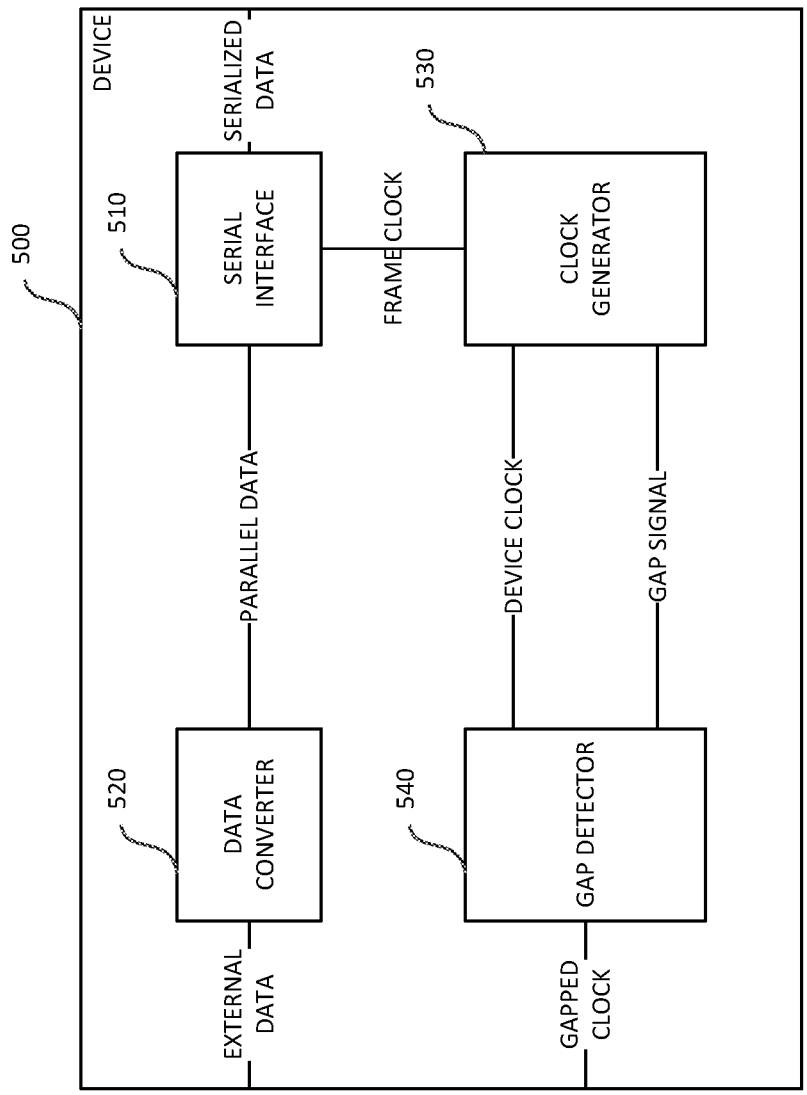
FIG. 5 is a block diagram illustrating components of an electronic/semiconductor device according to aspects of the subject technology.

FIG. 5 is a block diagram illustrating components of an electronic/semiconductor device according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components are not limited to direct connections or direct couplings and may be implemented with one or more intervening components unless expressly stated otherwise.

As depicted in FIG. 5, electronic/semiconductor device 500 includes serial interface 520, data converter 520, clock generator 530, and gap detector 540. Electronic/semiconductor device 500 may represent any of converter devices 410, 420, and 430 and/or logic device 440. According to aspects of the subject technology, serial interface 510 includes suitable logic, circuitry, and/or code to enable serial interface 510 to communicate serialized data with another electronic/semiconductor device using the interface described above. For example, serial interface 510 may implement transport, link, and physical layers of an interface protocol, such as JESD204, to serialize parallel data received from data converter 520, process and encode the serialized data, and transmit data frames containing the serialized data to the other electronic device using a frame clock signal from clock generator 530 to synchronize the timing with other electronic devices in the system. Alternatively, serial interface 510 may receive data frames containing serialized data from another electronic device using the frame clock signal from clock generator 530 to synchronize with other electronic devices in the system, decode and de-serialize the data before providing the data as parallel data to data converter 520.

According to aspects of the subject technology, data converter 520 includes suitable logic, circuitry, and/or code to enable conversion of data from one format to another format. For example, data converter 520 may be configured as a digital-to-analog converter arranged to convert parallel digital data received from serial interface 510 into analog data (external data) that is provided to an antenna transmitter circuit (not shown) coupled to electronic/semiconductor device 500 for transmission. Alternatively, data converter 520 may be configured as an analog-to-digital converter arranged to convert an analog signal (external data) received from an antenna receiver circuit (not shown) coupled to electronic/semiconductor device 500 into digital parallel data that is provided to serial interface 510. The antenna receiver circuit and/or the antenna transmitter circuit may include one or more antenna elements configured to receive or radiate radio signals modulated with the analog signal, together with circuit elements configured to modulate/demodulate, filter, amplify, etc. the radio signals. Data converter 520 also may be configured to convert data between a first format (external data) used by an external system coupled to electronic device 500 and the parallel digital data communicated with serial interface 510.

According to aspects of the subject technology, clock generator 530 includes suitable logic, circuitry, and/or code to generate one or more internal clocks, such as the frame clock signal, for clocking operations of electronic device 500. The internal clocks may be generated from a device clock signal received from gap detector 540. For example, clock generator 530 may include one or more phase-locked loops, one or more frequency dividers, etc. arranged to generate the one or more internal clocks based on the received device clock signal. The timing of the one or more internal clock signals may be aligned with the device clock signal based on the gap signal received from gap detector 540 to synchronize data communications by serial interface 510 with other electronic devices in the system.

According to aspects of the subject technology, gap detector 540 includes suitable logic, circuitry, and/or code to detect and/or extract a synchronization signal (gap signal) from a gapped clock signal received from a clock generator and provide the gap signal together with a device clock signal recovered from the gapped clock signal to clock generator 530. The original device clock signal generated by the clock generator may be recovered from the gapped clock signal using a phase-locked loop. The recovered device clock signal may be compared against the gapped clock signal to identify the gaps in the signal to provide a synchronization/gap signal to clock generator 530. The subject technology is not limited to this process for extracting the gap signal from the gapped clock signal and may use other techniques to perform these functions.

If the synchronization signal is a periodic signal, which results in a periodic gapped clock signal, a phase-locked loop may see additional spurs at harmonics of the gap frequency. To address performance issues with the phase-locked loop that may result from the spurs, the periodic gap signal may be extracted from the gapped clock signal and applied as the feedback signal in a phase-locked loop with the gapped clock signal with the gaps in the periodic gap signal aligned with the gaps in the gapped clock signal.

According to aspects of the subject technology, a system is provided that includes a first electronic device, a plurality of second electronic devices coupled to the first electronic device via a plurality of interfaces, and a clock generator coupled to the plurality of second electronic devices and configured to provide a clock signal to each of the plurality of second electronic devices for clocking operation of the plurality of second electronic devices. The clock signal is a gapped clock signal having at least one gap created by the clock generator removing one or more clock pulses based on a synchronization signal, and the plurality of second electronic devices are configured to synchronize data transmission between the plurality of second electronic devices and the first electronic device via the plurality of interfaces using the at least one gap in the gapped clock signal to align the data transmission.

The plurality of second electronic devices may be further configured to generate respective internal clock signals using the clock signal provided by the clock generator, where the operations of the plurality of electronic devices may be clocked using the generated internal clock signals. Each of the plurality of second electronic devices may be configured to align the data transmission by using the at least one gap in the gapped clock signal to identify a clock cycle in the internal clock signal to start transmission of a data frame. The internal clock signal may be a frame clock and each of the plurality of second electronic devices may be further configured to phase align the respective frame clock with the clock signal provided by the clock generator.

The clock signal provided to one of the plurality of second electronic devices may have a different frequency from the clock signal provided to another one of the plurality of second electronic devices. The plurality of interfaces may be serial interfaces. The plurality of interfaces may implement a JESD204 standard. The plurality of second electronic devices may be converter devices. The converter devices may be analog-to-digital converters. The converter devices may be digital-to-analog converters.

The first electronic device may be a logic device configured to implement the plurality of interfaces with the plurality of second electronic devices and to process data communicated with the second plurality of electronic devices. The logic device may be a field-programmable gate array. The logic device may be an application-specific integrated circuit.

According to aspects of the subject technology, a semiconductor device is provided that includes a data converter configured to receive and convert external data into parallel data for transport, a serial interface coupled to the data converter and configured to serialize the parallel data received from the data converter and transmit the serialized data over a serial communication link to another device, a gap detector configured to receive a gapped clock signal and extract a device clock signal and a gap signal from the gapped clock signal, and a clock generator coupled to the gap detector and configured to receive the device clock signal from the gap detector and generate a frame clock based on the device clock signal. The clock generator is further configured to align the frame clock with a clock pulse of the device clock signal based on the gap signal, and the serial interface is further configured to receive the frame clock from the clock generator and to time the transmission of the serialized data over the serial communication link using the frame clock.

The data converter may include an analog-to-digital converter, where the external data is analog data and the parallel data is digital data converted from the analog data. The analog data may be received from an antenna receiver circuit coupled to the semiconductor device.

According to aspects of the subject technology, a semiconductor device is provided that includes a serial interface configured to receive serialized data over a serial communication link with another device and deserialize the serialized data into parallel data, a data converter configured to receive the parallel data from the serial interface and to convert the parallel data into external data, a gap detector configured to receive a gapped clock signal and extract a device clock signal and a gap signal from the gapped clock signal, and a clock generator coupled to the gap detector and configured to receive the device clock signal from the gap detector and generate a frame clock based on the device clock signal. The clock generator is further configured to align the frame clock with a clock pulse of the device clock signal based on the gap signal, and the serial interface is further configured to receive the frame clock from the clock generator and to time the reception of the serialized data over the serial communication link using the frame clock.

The data converter may include a digital-to-analog converter, where the parallel data is digital data and the external data is analog data converted from the digital data. The analog data may be provided to an antenna transmitter circuit coupled to the semiconductor device. The parallel data may be in a first format and the external data may be in a second format different from the first format.

According to aspects of the subject technology, the electronic/semiconductor devices described above may be implemented as application specific integrated circuits (ASIC), field programmable gate arrays (FPGA), programmable logic devices (PLD), controllers, state machines, gated logic, discrete hardware components, or any other suitable devices or combination of devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A system, comprising:
   a first electronic device;
   a plurality of second electronic devices coupled to the first electronic device via a plurality of interfaces; and
   a clock generator coupled to the plurality of second electronic devices and configured to provide a clock signal to each of the plurality of second electronic devices for clocking operation of the plurality of second electronic devices,
   wherein the clock signal is a gapped clock signal having at least one gap created by the clock generator removing one or more clock pulses based on a synchronization signal, and
   wherein the plurality of second electronic devices are configured to synchronize data transmission between the plurality of second electronic devices and the first electronic device via the plurality of interfaces using the at least one gap in the gapped clock signal to align the data transmission; and
   wherein a clock signal provided to one of the plurality of second electronic devices has a different frequency from a clock signal provided to another one of the plurality of second electronic devices.

2. The system of claim 1, wherein the plurality of second electronic devices are further configured to generate respective internal clock signals using the clock signal provided by the clock generator, and wherein the operations of the plurality of electronic devices are clocked using the generated respective internal clock signals.

3. The system of claim 2, wherein each of the plurality of second electronic devices is configured to align the data transmission by using the at least one gap in the gapped clock signal to identify a clock cycle in a generated respective internal clock signal to start transmission of a data frame.

4. The system of claim 3, wherein the generated respective internal clock signal is a frame clock and each of the plurality of second electronic devices is further configured to align a phase of a respective frame clock with a phase of the clock signal provided by the clock generator.

5. The system of claim 1, wherein the plurality of interfaces are serial interfaces.

6. The system of claim 5, wherein the plurality of interfaces implement a JESD204 standard.

7. The system of claim 1, wherein the plurality of second electronic devices are converter devices.

8. The system of claim 7, wherein the converter devices are analog-to-digital converters.

9. The system of claim 7, wherein the converter devices are digital-to-analog converters.

10. The system of claim 1, wherein the first electronic device is a logic device configured to implement the plurality of interfaces with the plurality of second electronic devices and to process data communicated with the second plurality of electronic devices.

11. The system of claim 10, wherein the logic device is a field-programmable gate array.

12. The system of claim 10, wherein the logic device is an application-specific integrated circuit.

13. A system, comprising:
a first electronic device;
a plurality of second electronic devices coupled to the first electronic device via a plurality of interfaces; and
a clock generator coupled to the plurality of second electronic devices and configured to provide a clock signal to each of the plurality of second electronic devices for clocking operation of the plurality of second electronic devices,
wherein the clock signal is a gapped clock signal having at least one gap created by the clock generator removing one or more clock pulses based on a synchronization signal, and
wherein the plurality of second electronic devices are configured to synchronize data transmission between the plurality of second electronic devices and the first electronic device via the plurality of interfaces using the at least one gap in the gapped clock signal to align the data transmission; and wherein the plurality of interfaces are serial interfaces that implemented a JESD204 standard.

14. A system, comprising:
a first electronic device;
a plurality of second electronic devices coupled to the first electronic device via a plurality of interfaces; and
a clock generator coupled to the plurality of second electronic devices and configured to provide a clock signal to each of the plurality of second electronic devices for clocking operation of the plurality of second electronic devices,
wherein the clock signal is a gapped clock signal having at least one gap created by the clock generator removing one or more clock pulses based on a synchronization signal, and
wherein the plurality of second electronic devices are configured to synchronize data transmission between the plurality of second electronic devices and the first electronic device via the plurality of interfaces using the at least one gap in the gapped clock signal to align the data transmission; and wherein the plurality of second electronic devices are converter devices.

* * * * *